Feb. 16, 1932.   R. J. FAAS   1,845,652
SETTING FOR PLATE GLASS AND THE LIKE
Filed March 31, 1930

Inventor
Rudolph J. Faas,
By Owen & Owen,
Attorneys

Patented Feb. 16, 1932

1,845,652

UNITED STATES PATENT OFFICE

RUDOLPH J. FAAS, OF CHICAGO, ILLINOIS, ASSIGNOR TO ZOURI DRAWN METALS COMPANY, OF CHICAGO HEIGHTS, ILLINOIS, A CORPORATION OF ILLINOIS

SETTING FOR PLATE GLASS AND THE LIKE

Application filed March 31, 1930. Serial No. 440,228.

This invention relates to a setting for plate glass and the like, especially adapted for use in store front construction.

The general object of the invention is to provide a frame with metal moulding strips between which a plate of glass may be secured in a simple and practical manner, and the securing means concealed so that the frame has a finished and attractive appearance. In its present embodiment, the invention comprises a face moulding having a channel within which the securing means is inserted, and a supplemental moulding or finishing strip which may be snapped into place to cover the channel and the securing means.

The invention will be more particularly explained in connection with the accompanying drawings, in which Figure 1 is a perspective view of a frame section with the invention embodied therein.

Figure 1:
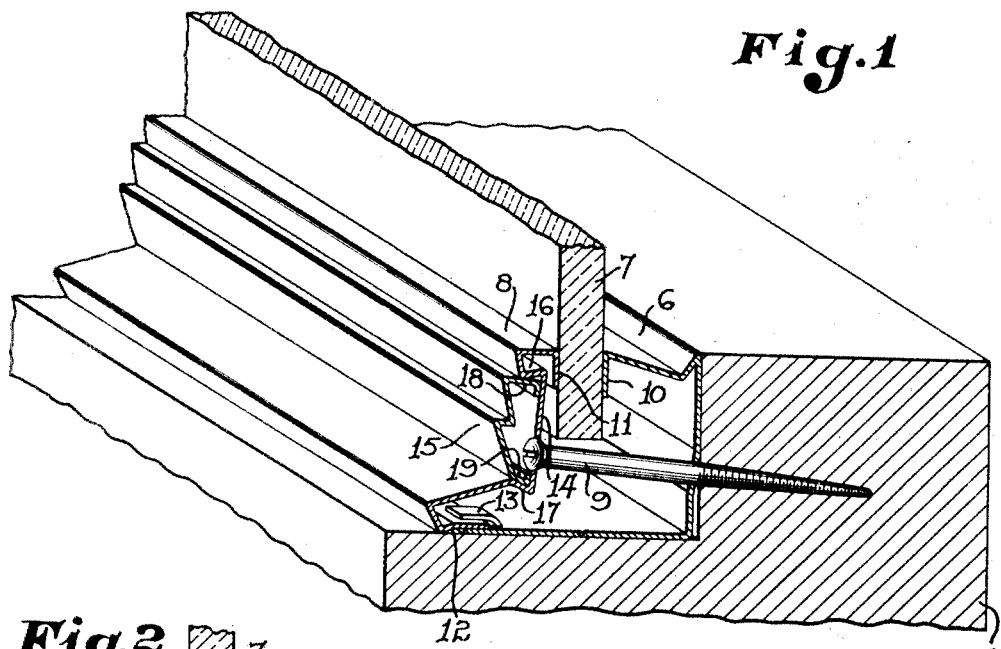

The invention is illustrated in connection with a rabbeted sill or frame 5 against which rests a rear clamping member 6. As illustrated in Figure 1 the glass 7 is held against the rear clamping member 6 by a front clamping member or moulding 8 which is secured in position by screws 9 or similar fastening means. The rear clamping member 6 is shown as having a glass engaging flange 10 and also a base flange which extends transversely across the plane of the glass. The front clamping member has at its upper edge a glass engaging flange 11 and at its lower edge a flange 12 which engages the base flange of the member 6, the latter being preferably provided with tongues 13 which extend over the flange 12.

The intermediate portion of the front clamping member 8 is formed with a channel 14 within which the screws 9 are inserted. The channel 14 and the heads of the screws 9 are covered by a supplemental moulding or finishing strip 15 which may be sprung into position after the clamping member 8 is secured in position. The sides 16 and 17 of the channel are shown as inwardly divergent and when the sides 18 and 19 of the strip 15 are swung into position as shown in Figure 1, the strip 15 is securely held and the outer face of the moulding has a smooth and finished appearance.

Figure 2:
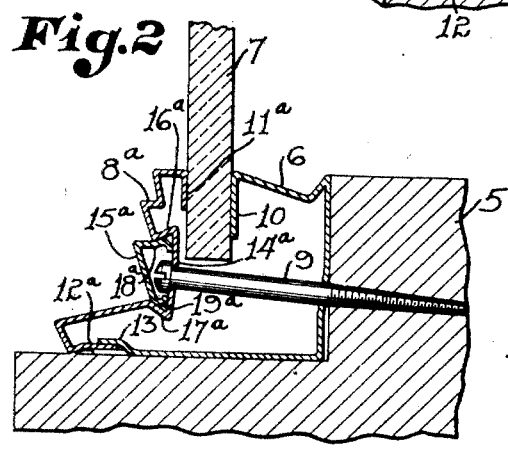
Figure 2 is a sectional view illustrating a modified form of the invention.

In the modification shown in Figure 2 the front clamping member $8_a$ is formed with an upper glass engaging flange $11_a$ and a bottom flange $12_a$. The intermediate channel $14_a$ is formed with inwardly divergent sides $16_a$ and $17_a$ between which the sides $18_a$ and $19_a$ of the supplemental finishing strip $15_a$ engage with a spring snap action as in the embodiment illustrated in Figure 1.

Figure 3:
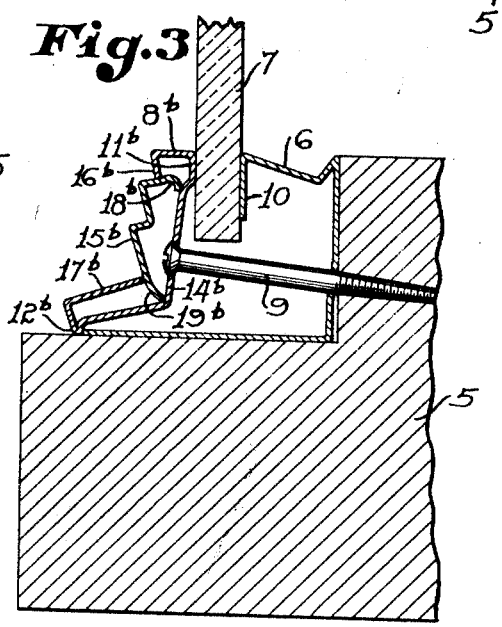
Figure 3 is a sectional view illustrating another modification.

In the modification shown in Figure 3 the front clamping member $8_b$ has a glass engaging portion $11_b$ and a base engaging portion $12_b$. Between these portions there is formed the equivalent of a channel portion $14_b$ through which the securing screws 9 pass. The reversely bent edges $16_b$ and $17_b$ of the face moulding constitute shoulders at the sides of the channel portion $14_b$ adapted to receive the finishing strip $15_b$, the sides of which, $18_b$ and $19_b$, are secured in position by a spring snap action, as in the form previously described.

Figure 4:
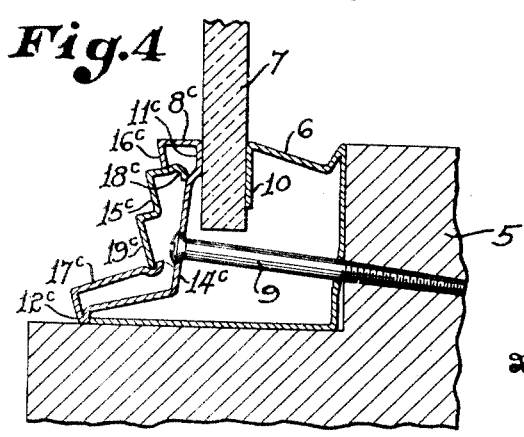
Figure 4 is a sectional view illustrating still another modification.

In the modification illustrated in Figure 4, the face moulding $8_c$ has a glass engaging portion $11_c$ and a base engaging portion $12_c$ between which is a channel portion $14_c$ engaged by the securing screws 9. The reversely bent side edges $16_c$ and $17_c$ of the moulding $8_c$ constitute shoulders at the sides of the channel $14_c$ between which the sides $18_c$ and $19_c$ of the finishing strip $15_c$ are secured by a spring snap action in the same manner as previously described.

From the foregoing description, it will be seen that the present invention provides a glass securing means which is simple and inexpensive, which is easily installed and which presents a finished appearance when completed. While I have shown and described several forms in which the invention may be embodied, it is apparent that the same may be modified in other ways without departing from the essential features of the invention as claimed.

What I claim is:

1. In a store front construction, a sill member, a front clamping member and a rear clamping member seated on said member and adapted to receive a pane of glass between them, the front clamping member being formed with a channel, means for securing said clamping members in operative position, and a moulding strip having a spring snap connection with said channel and covering said securing means.

2. In a store front construction, a sill member, a front clamping member and a rear clamping member seated on said member and adapted to receive a pane of glass between them, means for securing said clamping members in operative position, the front clamping member being formed with opposed shoulders between which the securing means is located, and a moulding strip having a spring snap engagement between said shoulders and covering said securing means.

3. In a store front construction, a sill member, a front clamping member and a rear clamping member seated on said member and adapted to receive a pane of glass between them, the front clamping member being formed with a channel, means for securing said front clamping member in clamping position, said securing means having a head within said channel, and a moulding strip having a spring snap connection with said channel and covering said head.

4. In a store front construction, a sill member, a front clamping member and a rear clamping member seated on said member and adapted to receive a pane of glass between them, the front clamping member being formed with opposed shoulders, means for securing said front clamping member in clamping position, said securing means having a head disposed between said shoulders, and a moulding strip having a spring snap engagement between said shoulders and covering said securing means.

5. In a store front construction, a sill member, a rear clamping member having a glass engaging flange and a base flange extending across the plane of the glass outside the edge thereof, a front clamping member engaging the front face of the glass and said base flange respectively, a securing member passing through said clamping members and engaging said sill member, said front clamping member having intermediate shoulders between which said securing means is located, and a moulding strip having a spring snap engagement with said shoulders and covering said securing member.

6. In a store front construction, a rabbeted sill member, a front and a rear clamping member in the rabbeted part of said sill and adapted to receive a pane of glass therebetween, said front member having a channel, means for securing said members in a glass engaging position, and a moulding strip fitting in said channel for covering said securing means.

7. In a store front construction, a sill member, a front and a rear clamping member on said sill and adapted to receive a pane of glass therebetween, the front clamping member having a channel, means engaging said channel and sill for holding said members in a glass engaging position, and a moulding strip fitting in said channel for covering said securing means.

8. In a store front construction, a rabbeted sill member, a rear clamping member seated in the rabbeted sill, a front clamping member resting on said sill, said front member having a channel, means for securing said members together for holding a pane of glass therebetween, and a moulding strip fitting in said channel for covering said securing means.

9. In a store front construction, a rabbeted sill member, a rear clamping member seated in the rabbeted sill, a front clamping member resting on said sill and engaging said rear member, said front member having a channel, means for drawing said members into a glass engaging position for holding a pane of glass therebetween, and a moulding strip fitting in said channel for covering said securing means.

10. In a store front construction, a rabbeted sill member, a rear clamping member seated in the rabbeted sill, said member having projecting tongue portions, a front clamping member resting on said sill and adapted to engage with said portions, said member having a channel, means engaging said channel and sill for securing said members together for holding a pane of glass therebetween, and a moulding strip having a spring snap engagement with said channel for covering said securing means.

11. In a store front construction, a front and a rear clamping member adapted to receive a pane of glass therebetween, the front clamping member having reversely disposed edge portions providing a channel, means for securing said members together, and a moulding strip having a spring snap engagement with said channel for covering said securing means.

12. In a store front construction, a front and a rear clamping member adapted to receive a pane of glass therebetween, the front clamping member having reversely bent edge portions defining an opening on the front face thereof, means for securing said members together, and a moulding strip having a spring snap engagement between said edge portions for covering said securing means.

13. In a store front construction, a front and a rear clamping member adapted to receive a pane of glass therebetween, the front clamping member having reversely bent edge portions defining an opening on the front face thereof, one of said edge portions having a depression, means for securing said members together, and a moulding strip having a spring snap engagement and fitting in said depression and between the same and the other edge portion of said member.

In testimony whereof I have hereunto signed my name to this specification.

RUDOLPH J. FAAS.